US005463213A

United States Patent [19]
Honda

[11] Patent Number: 5,463,213
[45] Date of Patent: Oct. 31, 1995

[54] CODE MARK READER

[76] Inventor: Takafaru Honda, 1-1530-1 Kaijincho Minami, Funabashi-Shi; Chiba-ken, Japan

[21] Appl. No.: 237,487

[22] Filed: May 3, 1994

[51] Int. Cl.$^6$ .................................... G06K 7/10
[52] U.S. Cl. ........................ 235/468; 235/467; 235/472
[58] Field of Search ................................ 235/467, 472, 235/468

[56] References Cited

U.S. PATENT DOCUMENTS

| 4,939,354 | 7/1990 | Priddy et al. | |
| 5,206,491 | 4/1993 | Katoh et al. | 235/467 |
| 5,291,028 | 3/1994 | Droge et al. | 235/472 |
| 5,314,631 | 5/1994 | Katoh et al. | 235/467 |

Primary Examiner—Harold Pitts
Attorney, Agent, or Firm—Jordan and Hamburg

[57] ABSTRACT

So that even small code marks or code marks put on metal by laser marking can be correctly read, an infrared camera 6 is disposed in a focus adjustable manner above a stage 1 on which an object to be read is placed, and two laser beam irradiators 8, 8' are disposed on both sides of the camera to face obliquely downwards such that one laser beam provides a spot of light elongated lengthwise (vertically) and the other laser beam provides a spot of light elongated widthwise (horizontally), and that these two light spots intersect with each other in a crisscross at the position coincidental with the focus of the camera. In addition, a plurality of illumination blocks 10 each equipped with infrared emitting diodes 9 are disposed in the polygonal form around the camera 6 so as to illuminate the stage 1, the angle of each of the illumination blocks being variable, brightness of each of the illumination blocks being adjustable.

19 Claims, 4 Drawing Sheets

CODE MARK READER

BACKGROUND OF THE INVENTION

1. Field of the Invention

The present invention relates to a reader for so-called code marks, and more particularly to a code mark reader capable of correctly reading even those small code marks which are formed on metal surfaces by oxidation marking or engraving.

2. Description of the Related Art

Optically readable code marks such as bar codes are becoming more commonly used in various fields. With the recent increase in the amount of information to be encoded in code marks, typical bar codes with which information can be encoded in only one direction have become unable to provide a sufficient space for encoding.

Therefore, so-called binary code marks, by which information can be encoded in vertical and horizontal directions, have been put into use. As examples of this type of code mark, "carla code", "vericode" and "data code" have come into general use. Among them, the data code is disclosed in U.S. Pat. No. 4,939,354 and is designed such that individual cells of a grid pattern divided in vertical and horizontal directions are colored black or white to thereby create a code mark.

Meanwhile, the kinds of products provided with code marks have also been increasing recently. For example, code marks are put on surgical equipment, such as surgical instruments, for the purpose of inventory control of said equipment in hospitals. Since many surgical instruments are small in size, code marks are required to be correspondingly small on the order of, e.g., 2×2 mm in size. Furthermore, bar codes are also becoming increasingly used in books and other publications. In order not to mar the finish of bindings or covers, code marks put on books are ideally as small as possible.

In the case of the data code, a mark is taken in as an image by a camera, and the mark image in black and white is converted into a matrix comprised of 0's and 1's, thereby decoding the data written in the mark. For correct decoding of the data, therefore, black and white mark elements must be precisely and distinctly discriminated without errors and be displayed as an image. Then, even if a mark is small, a camera has to be able to take in such a small mark with correct discrimination between black and white.

When a code mark is engraved on, e.g., surgical instruments by using a laser, recesses and projections on the metal surface are taken in the form of an image by a camera and are discriminated respectively as black and white elements of the mark. In other words, unlike a mark printed in black and white, a mark in the form of recesses and projections on a metal surface, which is not originally colored, has to be recognized as a black and white image. It is thus required that, when recesses and projections on the metal surface are photographed by a camera, they are correctly discriminated and reproduced to be black and white in the form of image.

In the case of oxidation marking, because marked portions are turned black, discrimination between black and white marks in images is easier than the case of engraving marking. However, where the metal surface is finished to be, e.g., pear-skin by staining, ruggedness specific to the metal surface may be reproduced in the form of black and white images in addition to objective marks.

Another problem is that, because reflecting conditions of light are different depending on differences in the finish of the metal surface (e.g., mirror surface, pear-skin, hairline, buff and scotch), marks may not be correctly read due to halation or other reasons unless the lighting is properly set up.

Moreover, for surgical instruments, their shapes are not fixed, areas in which marks are marked are not always flat, and the distances between the levels of mark area and the camera are not constant when the instruments are put on a stage for reading one after another. Accordingly, when a fixed-focus type camera is used, the camera or the stage has to be movable for adjustment of the focus.

SUMMARY OF THE INVENTION

In order to correctly read marks formed on any products having different shapes, a reading camera is required to be of non-contact type. But since a non-contact type camera is affected by light sources in the external environment, it is necessary to use an infrared camera for negating the influence of those light sources in the external environment. Even when surgical instruments, for example, are contained in sterilization bags, code marks can be read from outside the bags by using an infrared camera.

On the other hand, in order to obtain clear images with an infrared camera, surgical instruments have to be illuminated with infrared rays and, on this occasion, the lighting to the surface of each surgical instrument with infrared rays must be optimally adjusted depending upon changes in not only the surface condition of surgical instruments, but also surrounding brightness. The intensity of illumination, the incident angle of light, and the incoming direction of light, by way of example, must be properly adjusted. If the object is illuminated from one point, halarian would be caused, or a shadow of the light would appear as a stripe in the image. Additionally, since surgical instruments and the like are shaped in different ways so that some of them are slender and others have curved surfaces including those which have marks thereon, marks are not always correctly read if they are illuminated simply from one point.

Further, in the case of using a fixed-focus type of camera, it is necessary for either the camera or stage to be made vertically movable and for the coincidence of the camera focus with the mark to be confirmable in some way. For small code marks, particularly, if the focus is offset even a little, correct discrimination between black and white cannot be made, resulting in erroneous decoding of the code marks.

To deal with such a case, a method of irradiating laser beams towards a mark from two directions and confirming coincidence of the camera focus with the mark at the point where two spots of the laser beams coincide with each other, is conceivable. This method enables the focus coincidence point to be confirmed, but cannot be used to determine whether the distance between the camera and the marks is too short or long, when the focus is not coincident with the marks, i.e., when two light spots appear.

In view of the above, the code mark reader of the present invention resides in that an infrared camera is disposed in a focus adjustable manner above a stage on which an object to be read is positioned, and two laser beam irradiators are disposed on both sides of the camera to face obliquely downwards such that one laser beam provides a spot of light elongated lengthwise (vertically) and the other laser beam provides a spot of light elongated widthwise (horizontally), and that these two light spots intersect with each other in a crisscross at the position coincidental with the focus of the camera.

Also, the code mark reader of the present invention resides in that an infrared camera is disposed in a focus adjustable manner above a stage on which an object to be read is positioned, and a number of illumination blocks each equipped with infrared emitting diodes are disposed in the polygonal form around the camera so as to illuminate the object holding stage, the angle of each of the illumination blocks being variable, brightness of each of the illumination blocks being adjustable.

Further, the code mark reader of the present invention resides in combination of the above two features, i.e., in that an infrared camera is disposed in a focus adjustable manner above a stage on which an object to be read is positioned, two laser beam irradiators are disposed on both sides of the camera to face obliquely downwards such that one laser beam provides a spot of light elongated lengthwise (vertically) and the other laser beam provides a spot of light elongated widthwise (horizontally), and that these two light spots intersect with each other in a crisscross at the position coincidental with the focus of the camera, and a plurality of illumination blocks each equipped with infrared emitting diodes are disposed in a polygonal form around the camera so as to illuminate the object holding stage, the angle of each of the illumination blocks being variable, brightness of each of the illumination blocks being adjustable.

When a surgical instrument, for example, marked with a code mark is put on the object holding stage, the infrared camera 6 is then vertically moved for adjustment of the focus. By arranging the laser beam irradiators to be vertically movable together with the camera, the two laser beam irradiators disposed on both sides of the camera are also moved vertically at the same time, and further, the irradiated position of the two crossing laser beams correspondingly moves vertically.

With an arrangement so that one laser beam provides a spot of light elongated lengthwise (vertically) and the other laser beam provides a spot of light elongated width-wise (horizontally), if the focus of the camera is set to be coincidental with the intersecting point of the two light spots in a crisscross, the camera position can be adjusted to focus on the code marks by adjusting the position where the surgical instrument is placed and also adjusting the height of the camera so that the code marks coincide with the intersecting point of the crisscrossed light spots.

Since the two laser beams provide light spots which are elongated and extend in different directions at an angle of 90 degrees therebetween, whether the camera position is too high or low can be promptly judged from the positional relation of the two light spots. If the light spots are simply point-shaped, it could not be determined which light spot corresponds to the laser beam irradiated from which position, hence whether the camera position is too high or low could not be determined. Additionally, if it is only required to differentiate between the two light spots, this discrimination can be made by shading these light spots in different colors. By positioning the two light spots so as to intersect with each other in a crisscross, it is ensured that rectangular code marks can be read in a state where the marks are positioned at a correct angle with respect to the camera.

Furthermore, since the plurality of illumination blocks each equipped with infrared emitting diodes are disposed in the polygonal, e.g., rectangular, form, a code mark on the object to be read, such as a surgical instrument, can be illuminated from four, six, eight or any number of directions. In addition, by adjusting the angle and brightness of each of the illumination blocks, optimum illumination can be achieved depending on the surface condition of the object to be read and the marking condition of the code marks.

Moreover, if the reader is arranged to store data concerning the angle and brightness of each of the illumination blocks adjusted for the surface condition of the object to be read and the marking condition of the code marks, the optimum illuminating environment can be easily reproduced. For example, when code marks are marked by laser marking on a metal surface, the illumination blocks are set to illuminate the code marks with light strongly from four directions when the metal surface is like pear-skin, from only one direction when it is a mirror surface, and from only two directions perpendicular to fine lines when it has a hairline finish.

As an alternative, when reading one mark, the mark may be read by making the above-described three kinds of light adjustments successively, and the best result from the three readings may be output to the next stage as the reading result for the mark. Also, it is possible to provide a device separately for determining the condition of the metal and to select the optimum illumination environment through adjustment depending on the examination result.

Further, by properly adjusting the wavelength of the laser beams, the infrared camera can be protected from any interference from the laser beams. Using an infrared camera as the reader and illuminating the object with infrared rays makes it possible to read only an image of the object under infrared illumination without that image being affected by the reader's surroundings (brightness).

Additionally, manual focus adjustment may be dispensed with by using an infrared camera of not fixed-focus type but auto-focusing type. In this case, the camera and the stage can be set in fixed condition.

DETAILED DESCRIPTION OF THE PREFERRED EMBODIMENT

Figure 1:
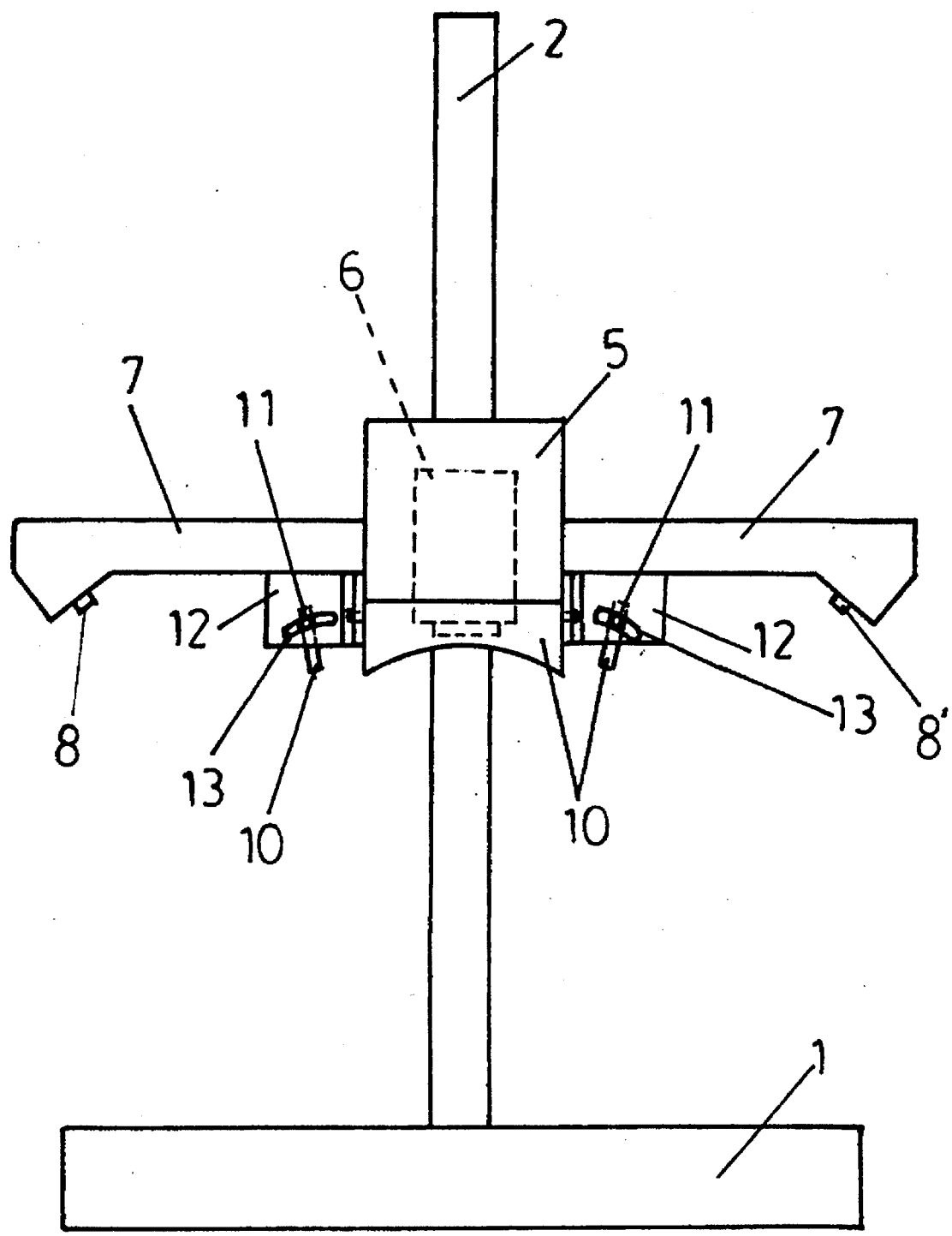
FIG. 1 is a front view of a code mark reader.
Figure 2:
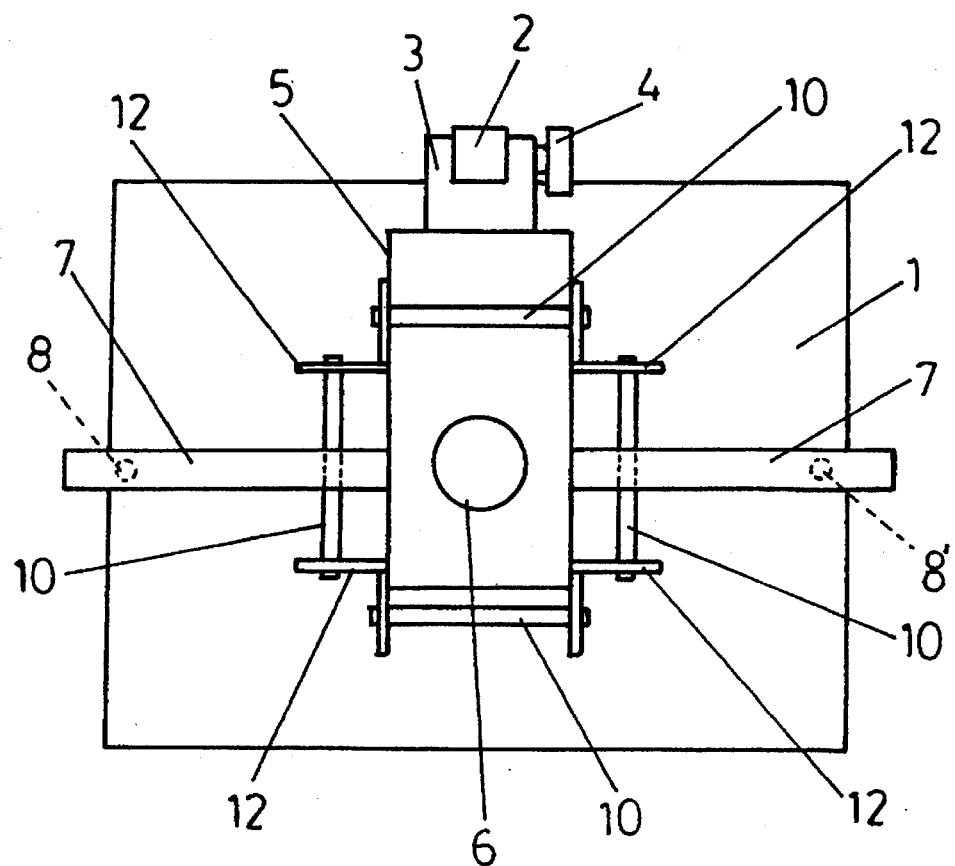
FIG. 2 is a plan view of the code mark reader.
Figure 3:
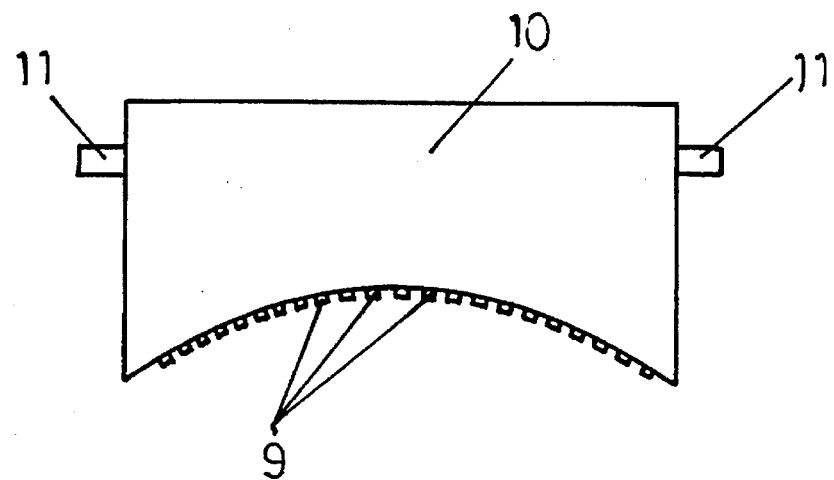
FIG. 3 is an enlarged front view of an illumination block.

One embodiment of the code mark reader according to the present invention will be described below with reference to FIGS. 1 to 3.

Denoted by reference numeral 1 is a stage on which an object to be read is placed, and 2 is a camera mount shaft vertically mounted on the object holding stage 1. 3 is a movable frame which is slidably fitted to the camera mount shaft 2, moves vertically, and can be fixed to the camera mount shaft 2 at any desired position by tightening clamp screw 4. As an alternative, it may be arranged such that thread grooves are linearly formed as a rack in the camera mount shaft 2 and a pinion gear is provided on the movable frame 3, allowing the movable frame 3 to move vertically through engagement between the pinion gear and the rack. Also, the object holding stage 1 may be arranged to be vertically movable. In any case, it is essential that the focus of the camera be adjustable.

Denoted by 5 is a rectangular camera mount frame which has an opening at the top and bottom and is fixed to the movable frame 3. 6 is an infrared camera disposed in a central portion of the camera mount frame 5 with its lens facing the object holding stage 1. The camera 6 used in the illustrated embodiment is of fixed-focus type.

Denoted by 7 is a pair of laser beam irradiator mount shafts mounted to extend outwardly from both sides of the camera mount frame 5 in opposite relation. Laser beam irradiators 8, 8' are disposed at respective shaft ends so as to face obliquely downwards. These laser beam irradiatars 8, 8' are set so that one irradiator 8 provides a spot of light elongated lengthwise (vertically) and the other irradiator 8' provides a spot of light elongated width-wise (horizontally). The two light spots intersect with each other in a crisscross at the position coincidental with the focus of the infrared camera 6. The laser beam spots may be elliptical in shape rather than linearly elongated, because it is only necessary to be able to discriminate which laser beam spot is provided by which irradiator.

Denoted by 9 is an infrared emitting diode for emitting an infrared ray. A plurality of infrared emitting diodes 9 are disposed in two rows on an illumination block 10. The illumination block 10 has a surface curved into an arcuate shape, and the infrared emitting diodes 9 are disposed along two arcuate lines on the curved surface. With such an arrangement, all the infrared emitting diodes are disposed at the same distance with respect to the center at which infrared rays are concentrated, and the object can be illuminated with light from more than one concentrated infrared ray more softly than would be with light of a single strong infrared ray from one infrared emitting diode. This is effective to prevent halation or other adverse effects. 11 is a pair of support shafts positioned at both sides of the illumination block 10 for attaching it in place.

Denoted by 12 is a pair of illumination block mount plates which are fixed to the outer surface of the camera mount frame 5 and are formed by elongated holes 13 for engagement with the support shafts 11 of the illumination block 10. Both support shafts 11 of the illumination block 10 are inserted in the respective elongate holes 13 so that the illumination block 10 is sandwiched by the pair of illumination block mount plates 12 with a relatively strong force, allowing the illumination block 10 to be adjusted in its support angle and position. A plurality of illumination blocks can be adjusted to change the brightness or the intensity of illumination independently of one another. While the four illumination blocks 10 are disposed in the rectangular form in the illustrated embodiment, it is only required that illumination block 10 be disposed plural in number so as to surround the infrared camera. The angle and brightness of each of the illumination blocks 10 are adjustable. It is also possible to automatically determine the shape of the object to be read, surface material of the object, etc. and to automatically adjust the angle and brightness of each of the illumination blocks depending upon the determination.

Figure 4:
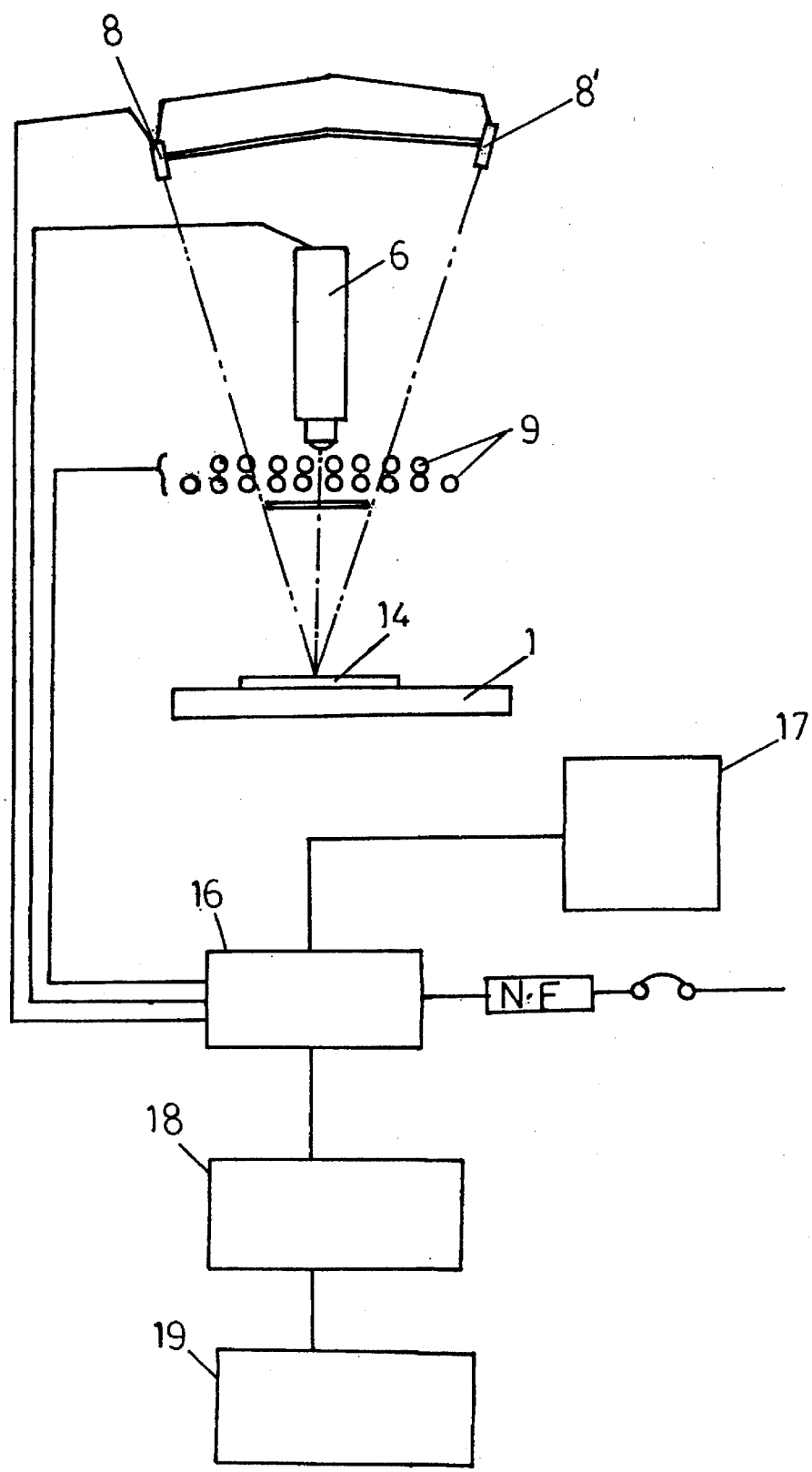
FIG. 4 is a block diagram of the system configuration for reading a code mark by using the code mark reader.
Figure 5:
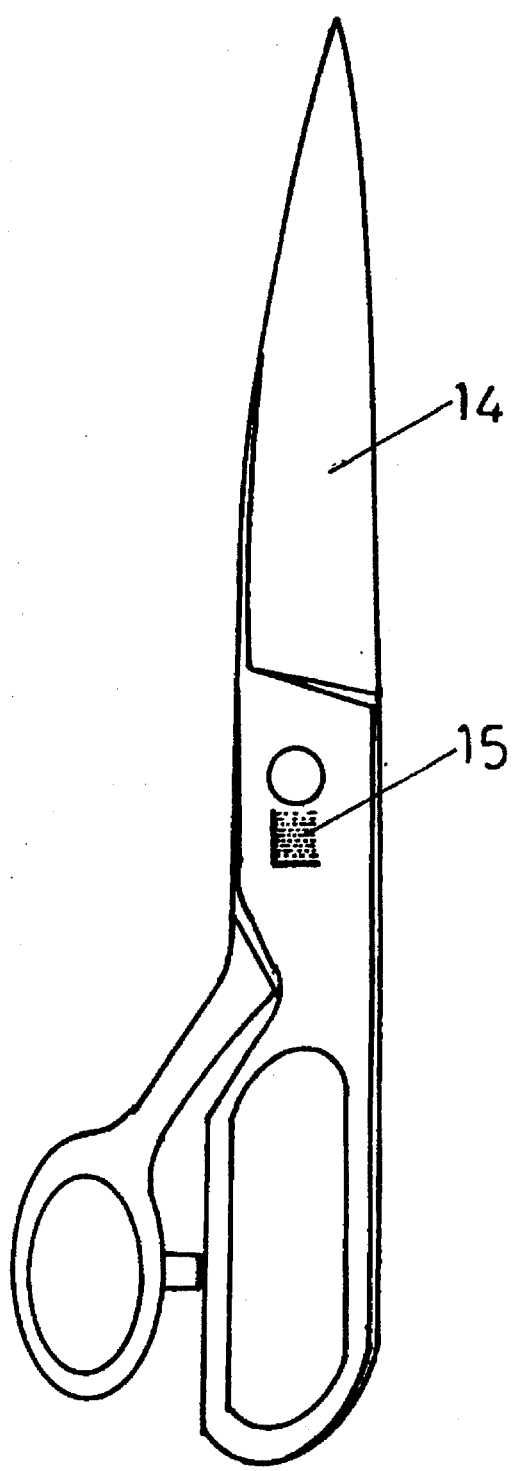
FIG. 5 is a plan view showing one example in which a data code is marked on surgical scissors.

A description will now be made of the method of reading a code mark on a surgical instrument by using the code mark reader arranged as above with reference to FIG. 4. Let it be assumed that, as shown in FIG. 5, a code mark 15 in the form of, e.g., data code previously explained, is marked on the surgical instrument 14, as the object to be read, by oxidation marking or engraving using a laser beam. In the case of oxidation marking, marked portions are turned black. On the other hand, in the case of engraving, the data code 15 marked as a two-dimensional symbol is neither white nor black in itself, being comprised of recesses engraved by a laser beam and projections which are flush with the metal surface but, as a result of being not subjected to the laser beam, are projecting relative to the recesses.

First, the surgical instrument 14 marked with the data code 15 is placed on the object holding stage 1. Then, the position of the surgical instrument 14 is adjusted and, at the same time, the height of the infrared camera 6 is adjusted so that the data code 15 comes to the position where both the light spots of the laser beam irradiators 8 and 8' intersect with each other in a crisscross.

Subsequently, the angle and brightness of each illumination block 10 is adjusted. When the surface of the surgical instrument 14 is a mirror finished surface, the surgical instrument 14 is illuminated by using only one illumination block 10 for the purpose of preventing halation. Then, the angle of that illumination block 10 is adjusted so as to prevent interference from the reflected light from the surgical instrument 14 with the infrared camera 6, thereby preventing halation.

When the surface of the surgical instrument 14 is finished to a pear-skin finish by staining, the illuminated surface is not completely smooth, but has fine ruggedness which is likely to generate shadows. To prevent the occurrence of these shadows, all of the four illumination blocks 10 are turned on at the same brightness to illuminate the surgical instrument 14 with strong light.

Further, when the surface of the surgical instrument 14 has a hairline finish, fine lines extending in one direction are present on the surface and are likely to generate stripe-shaped shadows. To prevent the occurrence of these shadows, only two illumination blocks 10 disposed to face in a direction perpendicular to the fine lines are turned on, and the other two illumination blocks 10 disposed to face in a direction parallel to the fine lines are turned off. Note that the method and angle of illumination as described above may be adjusted by an operator at need while looking at a monitor 17.

Image information read by the infrared camera 6 of the code mark reader is input to a sub-controller 16, for example. The infrared camera 6 employs, as an image sensing device, a CCD having 410,000 pixels. Of these pixels, a central portion of 680 pixels wide and 480 pixels long is reproduced in the form of an image. Further, to increase reproducibility of black and white in the image, the sub-controller 16 is designed to adjust outputs for dots in the next line based on data of corresponding dots in the line of preceding 1 H line for each pixel, thereby compensating for influences of halation or shadows.

The sub-controller 16 is also designed to determine whether the marks are marked by engraving or oxidation marking, and to make the image reversed in black and white colors upon automatic or manual switching. More specifically, in the case of oxidation marking, the marked portions are black and hence reproduced to be also black in the image as they are. In the case of engraving marking, however, the marked portions (recesses) would be reproduced to be white in the image if directly output. For this reason, the image information is output after being reversed between black and white. The sub-controller 16 may be integral within the body of the code mark reader.

The output of the sub-controller 16 is applied to a monitor 17 and a controller 18. The monitor 17 enables the operator to visually confirm how the data code 15 is read. In the controller 18, the data code 15, given as the image information from the sub-controller 16, is converted into a matrix comprised of 0's and 1's and then into character information. Note that the image information read by the infrared camera 6 may be directly input to the controller 18 without being sent via the sub-controller 16.

The character information converted in the controller 18 is transmitted to a computer 19 and is compared with the information entered in the computer 19 beforehand, following which the input from the controller 18 is processed and stored as predetermined information in the computer. For example, information about surgical instruments which are necessary for a surgical set are stored in the computer 18 beforehand, these items are then compared with the information from the controller 18, and data indicating which of the necessary surgical instruments 14 have been input or stocked are successively stored in the computer.

When the information contained in the data code 15 has been correctly input to the computer 19, an indication in the form of voice or a message on the monitor screen is issued for each data code to inform the user of the completion of the data input operation. Also, if the data code has not been read as correct information because of, e.g., a failure in image reading thereof, an alarm sound or the like is issued to indicate incapability of reading. In this way, the information contained in the data code 15 marked on the surgical instrument 14 is stored one by one in the computer 19.

While the above embodiment has been described in connection with the laser-marking of the data code as a code mark on the object to be read, it is needless to say that the reader of the present invention can also be used effectively in the laser-marking of other code marks such as the bar code, carla code and vericode, or marking of code marks by any other methods.

According to the code mark reader of the present invention, as described hereinabove, since an infrared camera is disposed in a focus adjustable manner above a stage on which an object to be read is held and two laser beam irradiators are disposed on both sides of the camera to face obliquely downwards such that one laser beam provides a spot of light elongated lengthwise (vertically) and the other laser beam provides a spot of light elongated widthwise (horizontally) and that these two light spots intersect with each other in a crisscross at the position coincidental with the focus of the camera, the camera position can be easily and precisely adjusted so that the focus of the camera coincides with the code mark by confirming the intersecting point of the two light spots of the laser beams.

Also, according to the code mark reader of the present invention, an infrared camera is disposed in a focus adjustable manner above a stage on which an object to be read is held, and a plurality of illumination blocks each equipped with infrared emitting diodes are disposed in the polygonal form around the camera so as to illuminate the object holding stage, the angle of each of the illumination blocks being variable, brightness of each of the illumination blocks being adjustable. Therefore, even if a code mark is marked on a metal surface by laser marking, the optimum illumination environment can be created suitable for the metal surface condition. As a result, the code mark formed by laser marking can be correctly read in the form of a black and white image.

Further, the use of an infrared camera makes it possible to read code marks on the objects to be read, such as surgical equipment and instruments in sterilization bags from outside the bags, thereby rendering the code mark reader convenient when used in hospitals. Since even such codes marks as engraved on metal can also be read, the durability of the mark can be increased considerably and can be adapted for every use environment as opposed to conventional code marks which are prepared by printing the marks and sticking mark labels to the objects.

Additionally, since influences from surrounding light sources can be negated by using the infrared camera, the reading camera can be of non-contact type so as to be capable of correctly reading marks put on any objects having various shapes.

What is claimed is:

1. A code mark reader comprising:

a stage on which an object to be read can be placed, an infrared camera disposed in a focus adjustable manner above said stage, and two laser beam irradiators disposed on opposite sides of said camera and facing downwards toward said stage in an oblique manner such that one laser beam provides a first spot of light on said stage elongated in a first direction and the other laser beam simultaneously provides a second spot of light on said stage elongated in a second direction substantially perpendicular to said first direction and intersecting said first spot of light in a criss-cross manner at a position coincidental with a focus point of said camera on said stage.

2. A code mark reader according to claim 1, further comprising means for permitting adjustable movement of said camera to adjust the focus thereof.

3. A code mark reader according to claim 2, wherein said means for permitting includes mount means for slidably mounting said camera thereon.

4. A code mark reader comprising:

a stage on which an object to be read can be placed, an infrared camera disposed in a focus adjustable manner above said stage, and a plurality of illumination blocks disposed in a polygonal formation around the camera so as to illuminate said stage, each block being provided with infrared emitting diodes, each block being oriented at an angle that is adjustable and the brightness of light from each block being adjustable.

5. A code mark reader according to claim 4, wherein each said illumination block has a lower arcuate surface, and said infrared emitting diodes are positioned on said lower arcuate surface such that all of said infrared emitting diodes are disposed at the same distance from said focus point of said camera on said stage.

6. A code mark reader according to claim 5, wherein said arcuate surface is a concave surface, with a middle portion thereof being positioned higher than end portions thereof.

7. A code mark reader according to claim 6, wherein said infrared emitting diodes are positioned in two rows extending in an arcuate direction of said lower arcuate surface.

8. A code mark reader according to claim 4, further comprising means for adjusting the brightness of light from each block by adjusting power supplied to each block.

9. A code mark reader according to claim 4, further comprising means for adjusting the brightness of light from each block, independent of the other blocks.

10. A code mark reader according to claim 4, further comprising means for adjusting the angle at which each said block is oriented.

11. A code mark reader comprising:

a stage on which an object to be read can be placed, an infrared camera disposed in a focus adjustable manner above said stage, two laser beam irradiators disposed on opposite sides of said camera and facing downwards toward said stage in an oblique manner such that one laser beam provides a first spot of light on said stage elongated in a first direction and the other laser beam simultaneously provides a second spot of light on said stage elongated in a second direction substantially perpendicular to said first direction and intersecting said first spot of light in a criss-cross manner at a position coincidental with the focus of said camera, and a plurality of illumination blocks disposed in a polygonal formation around the camera so as to illuminate said stage, each block being provided with infrared emitting diodes, each block being oriented at an angle that is adjustable and the brightness of light from each block being adjustable.

12. A code mark reader according to claim 11, further comprising means for permitting adjustable movement of said camera to adjust the focus thereof.

13. A code mark reader according to claim 12, wherein said means for permitting includes mount means for slidably mounting said camera thereon.

14. A code mark reader according to claim 11, wherein each said illumination block has a lower arcuate surface, and said infrared emitting diodes are positioned on said lower arcuate surface such that all of said infrared emitting diodes are disposed at the same distance from said focus point of said camera on said stage.

15. A code mark reader according to claim 14, wherein said arcuate surface is a concave surface, with a middle portion thereof being positioned higher than end portions thereof.

16. A code mark reader according to claim 15, wherein said infrared emitting diodes are, positioned in two rows extending in an arcuate direction of said lower arcuate surface.

17. A code mark reader according to claim 11, further comprising-means for adjusting the brightness of light from each block by adjusting power supplied to each block.

18. A code mark reader according to claim 11, further comprising means for adjusting the brightness of light from each block, independent of the other blocks.

19. A code mark reader according to claim 11, further comprising means for adjusting the angle at which each said block is oriented.

* * * * *